US011954202B2

United States Patent
Marbouti et al.

(10) Patent No.: US 11,954,202 B2
(45) Date of Patent: Apr. 9, 2024

(54) DEEP LEARNING BASED DETECTION OF MALICIOUS SHELL SCRIPTS

(71) Applicant: Capital One Services, LLC, McLean, VA (US)

(72) Inventors: Farshid Marbouti, San Jose, CA (US); Sarvani Kare, Clarksville, MD (US); Boshika Tara, Pleasanton, CA (US); Stephen Fletcher, Arlington, VA (US); Patrick Sofo, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 501 days.

(21) Appl. No.: 17/320,616

(22) Filed: May 14, 2021

(65) Prior Publication Data

US 2022/0366040 A1 Nov. 17, 2022

(51) Int. Cl.
*G06F 21/12* (2013.01)
*G06F 21/14* (2013.01)
*G06F 21/55* (2013.01)
*G06F 21/56* (2013.01)
*G06N 3/04* (2023.01)
(Continued)

(52) U.S. Cl.
CPC .......... *G06F 21/562* (2013.01); *G06F 21/554* (2013.01); *G06N 3/04* (2013.01); *G06N 3/045* (2023.01); *G06N 3/0464* (2023.01); *G06N 3/08* (2013.01); *G06F 2221/033* (2013.01)

(58) Field of Classification Search
CPC ............. G06F 21/554; G06F 2221/033; G06F 2221/003; G06F 21/562; G06N 3/04; G06N 3/08; G06N 3/0464; G06N 3/045; G06N 3/048; G06N 3/084; G06N 3/09; G06N 3/096
See application file for complete search history.

(56) References Cited

U.S. PATENT DOCUMENTS

| 11,620,379 B1* | 4/2023 | Hegde ...................... G06N 3/04 706/23 |
| 2018/0293381 A1* | 10/2018 | Tseng ...................... G06N 20/20 |
| 2020/0250309 A1* | 8/2020 | Harang .................... G06F 18/21 |

FOREIGN PATENT DOCUMENTS

CN 110348322 A * 10/2019

OTHER PUBLICATIONS

Hendler et al., "Detecting Malicious PowerShell Commands using Deep Neural Networks", Apr. 14, 2018. (Year: 2018).*

* cited by examiner

*Primary Examiner* — Jeremy S Duffield
*Assistant Examiner* — Pegah Barzegar
(74) *Attorney, Agent, or Firm* — Harrity & Harrity, LLP

(57) ABSTRACT

In some implementations, a system may receive a shell script associated with a computing device. The system may generate a character frequency feature vector based on the shell script. The system may input text of the shell script to a convolutional neural network (CNN) branch of a trained deep learning model. The system may input the character frequency feature vector to a feedforward neural network (FNN) branch of the trained deep learning model. The system may determine using the trained deep learning model, a respective probability score for each of a plurality of obfuscation types for the shell script based on a combined output of the CNN branch and the FNN branch. The system may detect whether the shell script is obfuscated based on the respective probability score for each of the plurality of obfuscation types determined for the shell script.

20 Claims, 10 Drawing Sheets

(51) Int. Cl.
*G06N 3/045* (2023.01)
*G06N 3/0464* (2023.01)
*G06N 3/08* (2023.01)

DEEP LEARNING BASED DETECTION OF MALICIOUS SHELL SCRIPTS

BACKGROUND

A shell script is text (e.g., a text file) that includes a sequence of commands to be executed by a command-line interface (CLI) of an operating system. A shell script typically combines a sequence of commands, that would otherwise have to be input one at a time, into a single script. The CLI, which may also be referred to as the "shell," interprets the commands included in the shell script and communicates with the operating system. Shell scripts typically include American Standard Code for Information Interchange (ASCII) text and may be written using a text editor, word processor, or graphical user interface, among other examples. Shell scripts may be written in various scripting languages associated with different shell types. For example, PowerShell, is a task automation and configuration management framework that is run on various operating systems (e.g., Windows, Linux, and/or macOS, among other examples) and includes a command-line shell (e.g., CLI) and an associated scripting language. PowerShell scripts are shell scripts written in the PowerShell scripting language to be executed by the PowerShell CLI.

SUMMARY

In some implementations, a system for detecting obfuscated shell scripts includes one or more memories, and one or more processors, communicatively coupled to the one or more memories, configured to: receive a shell script associated with a computing device; generate a character frequency feature vector based on the shell script; input, into a trained deep learning model that includes a convolutional neural network (CNN) branch and a feedforward neural network (FNN) branch: text of the shell script to the CNN branch, and the character frequency feature vector to the FNN branch; determine, using the trained deep learning model, a respective probability score for each of a plurality of obfuscation types for the shell script based on a combined output of the CNN branch and the feedforward neural network branch; and detect whether the shell script is obfuscated based on the respective probability score for each of the plurality of obfuscation types determined for the shell script.

In some implementations, a method detecting obfuscated shell scripts includes receiving, by a system, a shell script associated with a computing device; generating, by the system, a character frequency feature vector based on the shell script; inputting, by the system, text of the shell script to a CNN branch of a trained deep learning model that includes the CNN branch and an FNN branch; inputting, by the system, the character frequency feature vector to the FNN branch of the trained deep learning model; determining, by the system, using the trained deep learning model, a respective probability score for each of a plurality of obfuscation types for the shell script based on a combined output of the CNN branch and the FNN branch; and detecting, by the system, whether the shell script is obfuscated based on the respective probability score for each of the plurality of obfuscation types determined for the shell script.

In some implementations, a non-transitory computer-readable medium storing a set of instructions includes one or more instructions that, when executed by one or more processors of a system, cause the system to: receive a shell script associated with a computing device; generate a character frequency feature vector based on the shell script; input, into a trained deep learning model that includes a CNN branch and an FNN branch: text of the shell script to the CNN branch, and the character frequency feature vector to the FNN branch; determine, using the trained deep learning model, a respective probability score for each of a plurality of obfuscation types for the shell script based on a combined output of the CNN branch and the FNN branch; and detect whether the shell script is malicious based on the respective probability score for each of the plurality of obfuscation types determined for the shell script.

DETAILED DESCRIPTION

Figure 1A:
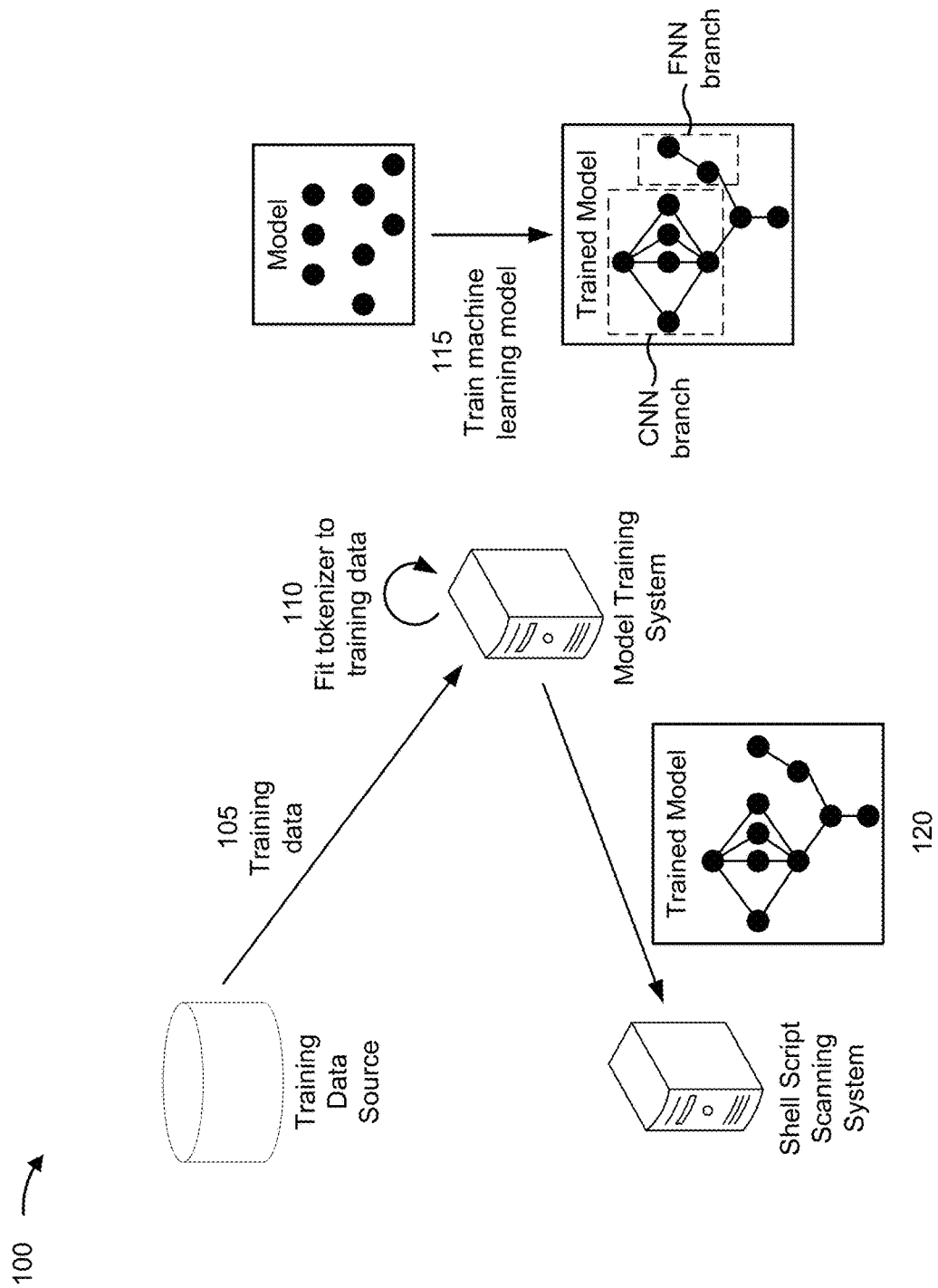
FIGS. 1A-1D are diagrams of an example implementation relating to deep learning based detection of malicious shell scripts.

The following detailed description of example implementations refers to the accompanying drawings. The same reference numbers in different drawings may identify the same or similar elements.

Shell scripts are used for various applications, such as automating code compiling, running a program and/or creating an environment, performing batch processing, manipulating files, linking existing programs together, executing backups, and/or performing system monitoring/management, among other examples. For example, shell scripts, such as PowerShell scripts, may be executed on various computing devices associated with an enterprise. In some cases, tens of millions of shell scripts may be executed per month across an enterprise. Such shell scripts executing on various computing devices may provide an opportunity for running malware, such as viruses, worms, trojan horses, spyware, adware, and/or ransomware, among other examples. For example, shell scripts may include malicious code to infect a computing device and/or a network connected to a computing device with such malware. Organizations typically use rule-based techniques for identifying malicious code in shell scripts. However, malicious actors that create malicious shell scripts may use obfuscation tools to deploy such malicious shell scripts while obfuscating the malicious code in the shell scripts. With obfuscation, a malicious line of code may appear in many different ways, thus rendering rule-based techniques ineffective for detecting the malicious code.

Some implementations described herein enable deep learning based detection of malicious shell scripts. In some implementations, the system may receive a shell script associated with a computing device. The system may generate a character frequency vector based on the shell script. A trained deep learning model may include a convolutional neural network (CNN) branch and a feedforward neural network (FNN) branch. The system may input text of the shell script to the CNN branch of the trained deep learning model, and the system may input the character frequency vector to the FNN branch of the trained deep learning model. The system may determine, using the trained deep learning model, a respective probability score for each of a plurality of obfuscation types for the shell script based on a combined output of the CNN branch and the FNN branch. The system may detect whether the shell script is obfuscated based on the respective probability score for each of the plurality of obfuscation types determined for the shell script. As a result, the system may detect obfuscated/malicious shell scripts with increased accuracy as compared to rule-based techniques and/or other machine learning techniques.

FIGS. 1A-1D are diagrams of an example 100 associated with deep learning based detection of malicious shell scripts. As shown in FIGS. 1A-1D, example 100 includes a model training system, a training data source, a shell script scanning system, one or more computing devices, a shell script database, and an administrator device. These devices are described in more detail in connection with FIGS. 5 and 6.

As described in FIG. 1A, and by reference number 105, the model training system may receive training data from the training data source. The training data may include a quantity of obfuscated shell scripts and a quantity of non-obfuscated shell scripts. In some implementations, the training data may include example shell scripts having different types of obfuscation. Each example shell script, in the training data, may include a respective ground truth label corresponding to the obfuscation type for that example shell script. In some implementations, the training data may include example shell scripts for a plurality of obfuscation types, including a string single quote obfuscation type, a string varying case obfuscation type, a string all obfuscation type, a string encode obfuscation type, an encoding string interpolation obfuscation type, a string backtick obfuscation type, and a non-obfuscation type (e.g., no obfuscation applied to the shell script).

In some implementations, the training data may include real training data and synthetic training data. "Real training data" refers to actual shell scripts (e.g., actual shell script observations) that are either not obfuscated or obfuscated using a particular obfuscation type. "Synthetic training data" refers to shell scripts generated (e.g., without obfuscation or with a particular obfuscation type) for training a machine learning model. In some implementation, synthetic training data may be generated from training examples included in the real training data. For example, synthetic obfuscated shell scripts may be generated be applying different types of obfuscation to non-obfuscated training examples included in the real training data.

As further described in FIG. 1A, and by reference number 110, the model training system may fit a tokenizer to the training data. The model training system may fit the tokenizer to the shell scripts in the training data to tokenize the shell scripts and learn a vocabulary from the shell scripts. "Tokenization" refers to splitting text into smaller units, such as individual words or phrases. In some implementations, the model training system may apply a tokenizer that performs word tokenization to the shell scripts. This may result in the separating the text of the shell scripts into individual words. In this case, by fitting the tokenizer to the shell scripts in the training data, the model training system may learn a vocabulary that includes all of the words used in the shell scripts in the training data.

As further described in FIG. 1A, and by reference number 115, the model training system may train a machine learning model based on the training data. In some implementations, the machine learning model may be a deep learning model that is trained to detect whether a shell script is obfuscated and predict an obfuscation type associated with the shell script. The deep learning model may be a machine learning model that has multiple layers through which data is transformed between input and output layers. For example, the deep learning model may be a deep neural network (DNN), which is an artificial neural network with multiple layers of nodes with learned weights between the input and output layers.

In some implementations, the deep learning model may include a CNN branch, an FNN branch, and classification layers that combine the outputs of the CNN branch and the FNN branch to determine probability scores for different obfuscation types for an input shell script. A CNN is a type of deep learning network that includes convolutional layers, which perform convolution on input data to extract feature maps (or activation maps) that are an internal representation of input data. The CNN branch may be a CNN that receives, as input, the text of a shell script. The CNN branch may process the text using multiple convolutional layers to extract features from sequences of words and/or characters in the text and map the extracted features to the different obfuscation types. During training, the CNN branch may be trained to learned how to extract internal features (e.g., feature maps) from the input text and how to map the internal features to the different obfuscation types. The CNN branch of the deep learning model can be trained directly from the raw training data (e.g., the text of the shell scripts), and thus provides a benefit of not requiring manually engineered features to be input.

An FNN is a DNN in which input data is processed through an input layer or function, intermediate computations (e.g., hidden layers), and an output layer, without feedback connections, in which outputs of the model are fed back into the model. An FNN may also be referred to as a deep feedforward network or a multilayer perceptron (MLP). The FNN branch may be an FNN that receives, as input, a character frequency vector associated with a shell script. The model training system may generate, for each shell script in the training data, a respective character frequency vector. In some implementations, the model training system may generate the character frequency vector for a shell script in the training data by determining, for each character of a plurality of characters in a character set, a respective number of occurrences for that character in the shell script. The character set may include various characters that may be associated with obfuscation. For example, the character set may include various punctuation marks (e.g., period, comma, exclamation point, question mark, quotation marks, apostrophe, semi-colon, colon, parentheses, and/or brackets, among other examples) and various "special" characters (e.g., @, #, $, %, ˆ, &, and/or *, among other examples). In some implementations, the character set may include 140 characters, and the character frequency vector may have a length of 140, with each value in the character frequency vector corresponding to a frequency at which a corresponding character in the character set occurs in the shell script.

In some implementations, for each shell script in a set of the training data used for training the deep learning model, the model training system may input the text of the shell script to the CNN branch, and the model training system may input the character frequency vector generated for the shell script to the FNN branch. The CNN branch and the FNN branch may process the respective inputs in parallel. In some implementations, the CNN branch may include an embedding layer, and the model training system may input the text of a shell script to the embedding layer. The embedding layer may encode the text of the shell script into a sequence of integers based on the learned vocabulary from the training data. For example, the integers in the sequence of integers may represent words in the text of the shell script. In this case, the model training system may assign a respective integer to each word in the learned vocabulary. For a shell script, the embedding layer may parse the text into words and generate the sequence of integers representing the words in the text by mapping each word to a respective integer value based on the integers assigned to the words in the learned vocabulary. In some implementations, the sequence of integers may have a set size, such that the size of the output of the embedding layer is the same for all shell scripts. For example, the size may be determined based on the length (e.g., number of words) of the shell scripts in the training data. In some implementations, the sequence of integers may be a 5,024-dimensional representation of the text in the shell script (e.g., a vector with a length of 5,024). The embedding layer may encode each word in the text of a shell script as an integer in the sequence of integers, and pad the remaining values (e.g., using a value of 0) in excess of the number of words in the shell script.

In some implementations, following the embedding layer, the CNN branch may include one or more convolutional layers and a pooling layer. A kernel size in the convolutional layer(s) defines a number of words to consider as the convolution is passed across the input text. In some implementations the CNN branch may include multiple CNN channels, with each CNN channel having a different respective kernel size that corresponds to the number of words from the text of a shell script that are grouped together at a time for that CNN channel. Accordingly, the different CNN channels may process the text at different resolutions (e.g., using different groups of words at a time). In this case, the different CNN channels may input the sequence of integers from the embedding layer using n-grams of different sizes, corresponding to the respective kernel sizes of the CNN channels. In some implementations, the CNN branch may include a first CNN channel that inputs the sequence of integers one at a time (n-gram of 1), a second CNN channel that inputs the sequence of integers two at a time (n-gram of 2), a third CNN channel that inputs the sequence of integers four at a time (n-gram of 4), and a fourth CNN channel that inputs the sequence of integers eight at a time (n-gram of 8). As described above, each integer in the sequence of integers represents a word in the text of a shell script. Accordingly, the n-gram input from the sequence of integers corresponds to a number of words grouped together at time in the text of the shell script. In some implementations, the CNN branches of the deep learning network may include more or fewer CNN channels, and/or CNN channels with different kernel sizes (n-grams).

In some implementations, each CNN channel may include one or more convolutional layers (e.g., 1D convolutional layers) and a pooling layer (e.g., a 1D max-pooling layer) to consolidate the output from the convolutional layers. The CNN branch may include a concatenation layer that concatenates the output from the multiple CNN channels into a single feature vector, which may then be processed by a dense layer and an output layer of the CNN branch. In the FNN branch, the deep learning network may directly read features from the character frequency vector through dense layers and dropout layers. The outputs from the CNN branch and the FNN branch may be combined in the classification layers of the deep learning network. A final classification layer (e.g., the output layer) may output the final classification for a shell script. In some implementations, the final classification may include predicted probability values for each of multiple obfuscation types (including a non-obfuscation type).

In some implementations, the model training system may train the deep learning network based on a set of the training data to minimize an error measurement between ground truth obfuscation types in the training data and predicted obfuscation type classification results for the training data using the deep learning network (e.g., based on the combined output of the CNN branch and the FNN branch) over the set of training data. For example, the model training system may utilize a back-propagation and gradient descent algorithm to learn weights, for the layers of the deep learning network, that minimize the error measurement between the ground truth obfuscation types and the predicted obfuscation type classification results over the set of training data. The model training system may train the deep learning network, including the CNN branch, the FNN branch, and the classification layers, as an end to end network. Combining the training of the CNN branch and the FNN branch may be referred to as ensemble learning. Deep learning networks may be non-linear and may have a high variance. The ensemble learning, in which the training of the CNN branch and the FNN branch is combined, may provide benefits of reducing the variance of the predictions and increasing the accuracy of the predictions, as compared to training an individual model.

In some implementations, the model training system may use transfer learning to train part of the deep learning model. Transfer learning may utilize a pre-trained model to learn initial weights for hidden layers (e.g., convolutional layers) in the deep learning model. For example, a pre-training model may be a saved network (e.g., CNN) that was previously trained on a large synthetic dataset. In some implementations, the model training system may utilize transfer learning to initially train layers of the deep learning network that perform feature extraction, and then train a new classifier (and adjust the initial weights in the initially trained layers) using the training data for the obfuscation types for which the deep learning model is being trained. In some implementations, the model training system may train a CNN using synthetic training data in order to learn weights for a feature extraction layer. The model training system may then use transfer learning to transfer the learned weights for feature extraction to the convolutional layers in the deep learning network. In this case, the model training system may then perform end-to-end training including the classification layers of the deep learning network using the real training data and/or a smaller set of combined real and synthetic training data.

As further described in FIG. 1A, and by reference number 120, the model training system may transmit the trained deep learning model to the shell script scanning system. In some implementations, the model training system may transmit, to the shell script scanning system, the model architecture and the learned weights for the trained deep learning model. In some implementations, the model training system may transmit, to the shell script scanning system, a model artifact that may be deployed in a production environment to detect obfuscated shell scripts using the trained deep learning model.

Figure 1B:
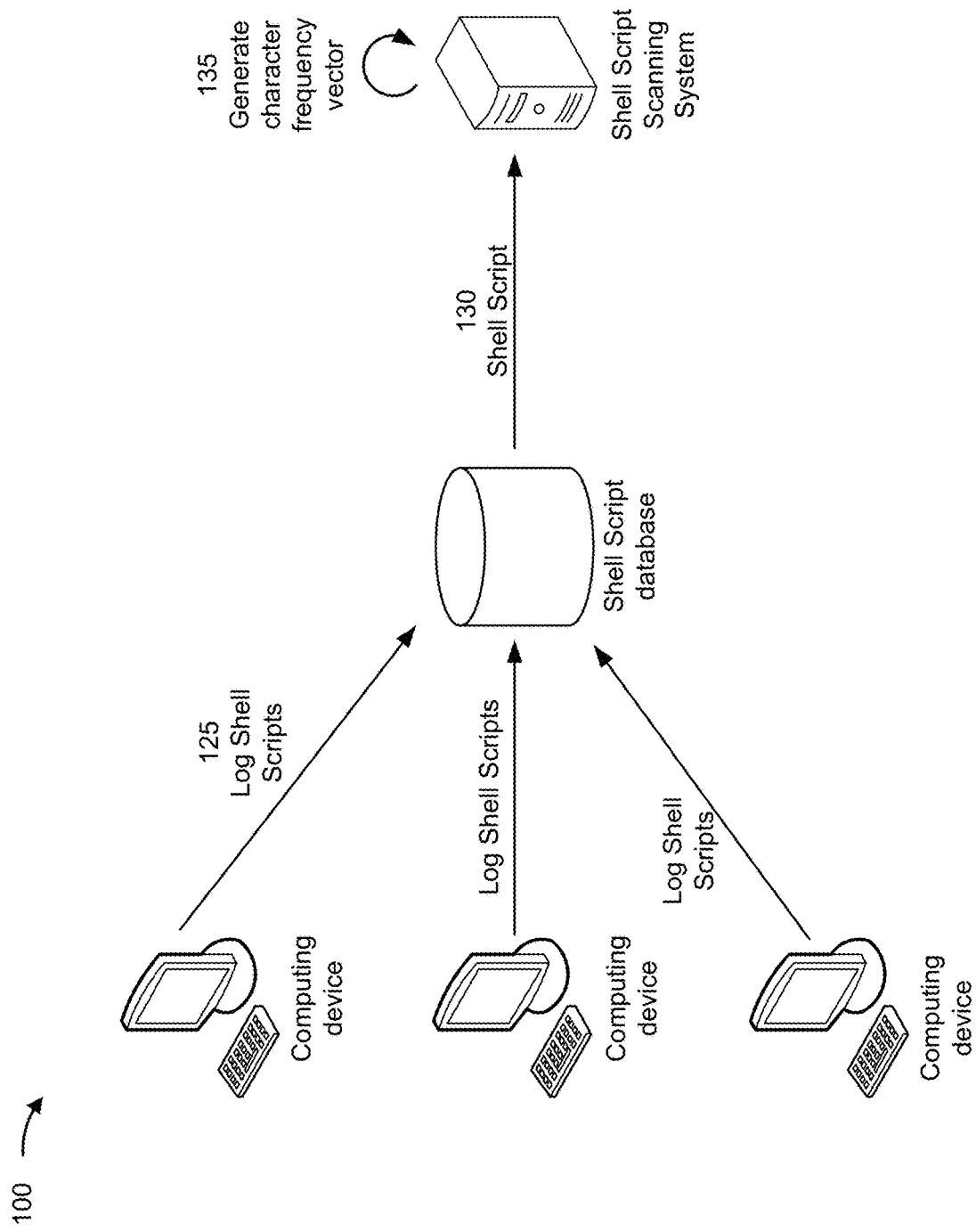

As shown in FIG. 1B, and by reference number 125, the computing devices may log shell scripts associated with the computing devices in a shell script database. For example, the computing devices may log shell scripts executed by the computing devices in the shell script database. A computing device may log a shell script in the shell script database by transmitting a copy of the shell script to the shell script database. The shell script database may store the shell scripts transmitted from the computing devices. In some implementations, a computing device may log a shell script to the shell script database prior to executing the shell script. In some implementations, a computing device may log a shell script to the shell script database while executing the shell script. In some implementations, a computing device may log a shell script to the shell script database after executing the shell script.

As further shown in FIG. 1B, and by reference number 130, the shell script scanning system may receive a shell script. For example, the shell script scanning system may receive the shell script from the shell script database. The shell script scanning system may scan the shell scripts logged in the database by the computing devices. In some implementations, the shell script scanning system may request a shell script from the shell script database, and the shell script scanning system may receive the shell script from the shell script database in response to the request.

As further shown in FIG. 1B, and by reference number 135, the shell script scanning system may generate a character frequency vector based on the shell script. As described above, the character frequency vector may represent the frequency, in the shell script, of each character of a plurality of characters in a character set. The shell script scanning system may generate the character frequency vector by determining, for each character in the plurality of characters in the character set, a respective number of occurrences in the shell script. As described above, the character set may include various characters (e.g., punctuation marks and/or special characters, among other examples) that may be associated with shell script obfuscation. For example, the character set may include 140 characters, and the character frequency vector may have 140 values, with each value in the character frequency vector corresponding to a frequency, in the shell script, of a corresponding character in the character set.

Figure 1C:
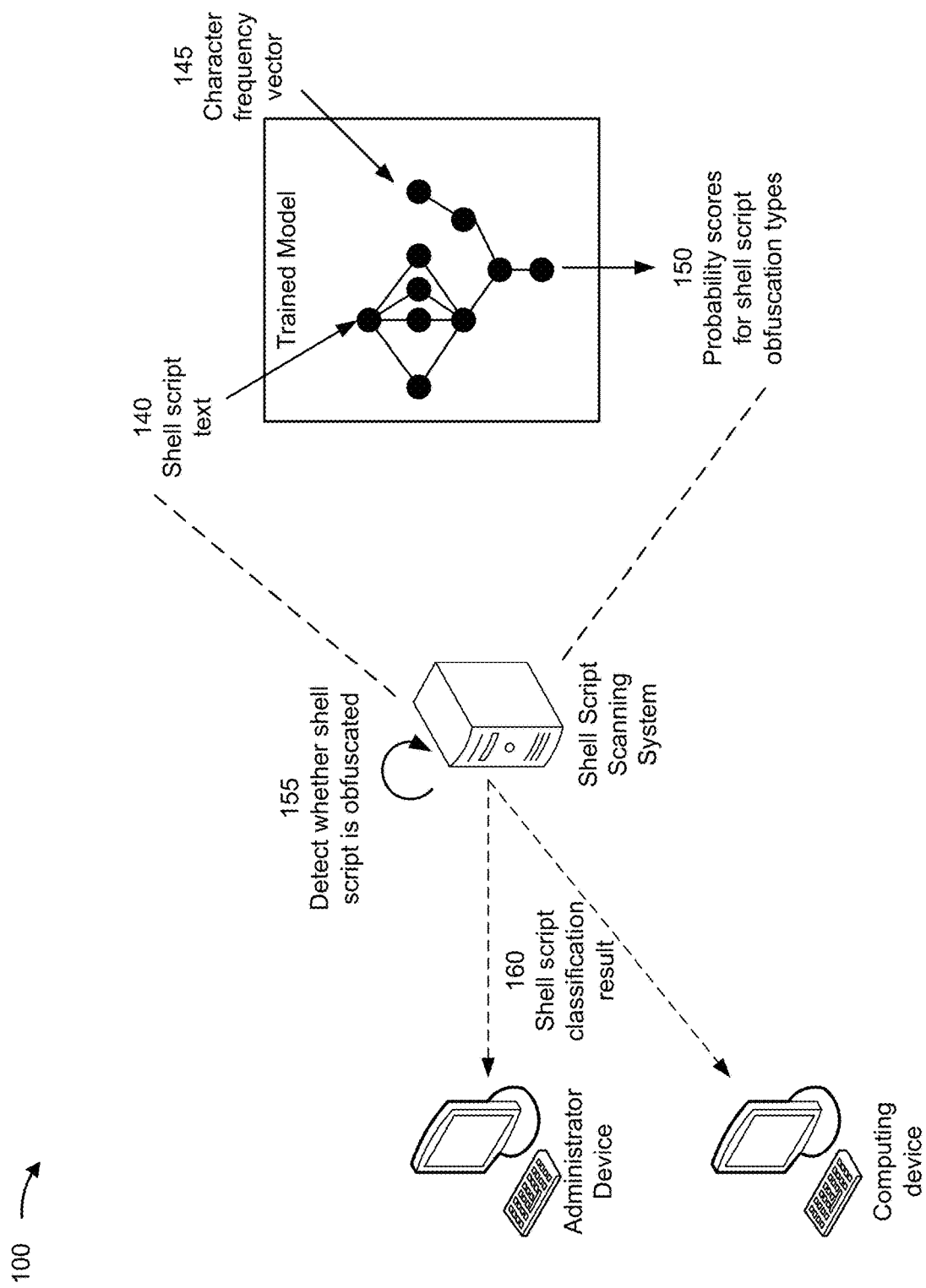

As shown in FIG. 1C, and by reference number 140, the shell script scanning system may input the text of the shell script to the CNN branch of the trained deep learning network. In some implementations, the shell script scanning system may input the text of the shell script into the embedding layer of the CNN branch of the trained deep learning network. The embedding layer may encode the text of the shell script as a sequence of integers based on the learned vocabulary from the training data. The integers in the sequence of integers may represent words in the text of the shell script. For example, the embedding layer may parse the text of the shell script into words and map the words to integer values based on integers assigned to words in the learned vocabulary. In some implementations, the sequence of integers may have a set size, and the embedding layer may pad (e.g., using a value of 0) remaining values in the sequence of integers in excess of the number of words in the shell script.

In some implementations, the CNN branch may be a multi-channel CNN branch that includes multiple CNN channels having different respective kernel sizes, and the respective kernel size, for each CNN channel, corresponds to a number of words from the text of the shell script that are grouped together at a time for that CNN channel. In this case, the CNN channels may input the sequence of integers from the embedding layer using n-grams of different sizes. For each CNN channel, the n-gram size may correspond to the kernel size. In some implementations, the CNN branch may include a first CNN channel that inputs the sequence of integers one at a time (n-gram of 1), a second CNN channel that inputs the sequence of integers two at a time (n-gram of 2), a third CNN channel that inputs the sequence of integers four at a time (n-gram of 4), and a fourth CNN channel that inputs the sequence of integers eight at a time (n-gram of 8). In some implementations, the CNN branch may concatenate the outputs of the multiple CNN channels into a single feature vector.

As further shown in FIG. 1C, and by reference number 145, the shell script scanning system may input the character frequency vector to the FNN branch of the trained deep learning model. The FNN branch may process the input character frequency vector through dense layers and dropout layers and output a feature vector based on the input character frequency vector. In some implementations, the trained deep learning network may process the shell script text input to the CNN branch and the character frequency vector input to the FNN branch in parallel.

As further shown in FIG. 1C, and by reference number 150, the shell script scanning system may determine, using the trained deep learning model, probability scores for a plurality of obfuscation types. In some implementations, the shell script scanning system may determine, using the trained deep learning model, respective probability scores for each of the plurality of obfuscation types based on a combined output of the CNN branch and the FNN branch. For example, the deep learning network may combine the feature vector output by the CNN branch and the feature vector output by the FNN branch into a combined feature vector or feature map. The classification layers of the deep learning network may predict and output probability scores for the plurality of obfuscation types based on the combined feature vector (or feature map) resulting from combining the outputs of the CNN branch and the FNN branch.

In some implementations, the plurality of obfuscation types may include a non-obfuscation type, associated with a shell script with no obfuscation, and one or multiple obfuscation types associated with malicious shell scripts. In this case, the deep learning network may output a probability score for the non-obfuscation type, and a respective probability score for each obfuscation type associated with malicious shell scripts. In some implementations, the plurality of obfuscation types may include a string single quote obfuscation type, a string varying case obfuscation type, a string all obfuscation type, a string encode obfuscation type, an encoding string interpolation obfuscation type, a string backtick obfuscation type, and a non-obfuscation type. In this case, the deep learning network may output a respective probability score for each obfuscation type, resulting in eight probability scores.

As further shown in FIG. 1C, and by reference number 155, the shell script scanning system may detect whether the shell script is obfuscated based on the probability scores determined for the plurality of obfuscation types for the shell script. The shell script scanning system may determine an obfuscation type for the shell script based on the probability scores determined for the plurality of obfuscation types. For example, the shell script scanning system may classify the shell script with an obfuscation type having a highest probability score of the plurality of obfuscation types. In a case in which the shell script scanning system determines that the obfuscation type for the shell script is the non-obfuscation type, the shell script scanning system may determine that the shell script is not obfuscated. In a case in which the shell script scanning system determines that the obfuscation type for the shell script is an obfuscation type other than the non-obfuscation type, the shell script scanning system may determine that the shell script is obfuscated.

In some implementations, the shell script scanning system may detect whether the shell script is malicious based on the determination of whether the shell script is obfuscated. For example, the shell script scanning system may determine that the shell script is malicious (e.g., includes malicious code) in a case in which the shell script is obfuscated, and/or the shell script scanning system may determine that the shell script is not malicious in a case in which the shell script is not obfuscated.

As further shown in FIG. 1C, and by reference number 160, the shell script scanning system may transmit, to a computing device and/or an administrator device, the shell script classification result. For example, the shell script scanning system may transmit, to the computing device and/or the administrator device, an indication of whether the shell script is obfuscated and/or an obfuscation type determined for the shell script.

In some implementations, based on a determination that the shell script is obfuscated and/or a determination that the shell script is malicious, the shell script scanning system may transmit an alert to the administrator device indicating that an obfuscated shell script is detected and the obfuscation type determined for the shell script. In this case, providing the specific obfuscation type determined for the shell script may be beneficial for a user of the administrator device (e.g., an administrator) to determine the purpose of the malicious code included in the shell script. Additionally, or alternatively, based on the determination that the shell script is obfuscated and/or the determination that the shell script is malicious, the shell script scanning system may transmit, to the computing device that logged the shell script, an alert indicating that an obfuscated shell script has been detected on that computing device and the obfuscation type determined for the shell script. In a case in which the obfuscated shell script is detected prior to the shell script being executed by the computing device, the alert may cause the computing device to not execute the shell script and/or delete the shell script.

In some implementations, based on a determination that the shell script is not obfuscated, the shell script scanning system may transmit, to the computing device and/or the administrator device, an indication that the shell script is not obfuscated. For example, in a case in which the computing device has not yet executed the shell script, the indication from the shell script scanning system may permit the computing device to proceed with executing the shell script. In some implementations, the shell script scanning system may transmit the alert to the administrator device and/or the computing device in a case in which the shell script in obfuscated, but the shell script scanning system may not transmit an indication to the administrator device and/or the computing device in a case in which the shell script is not obfuscated.

Figure 1D:
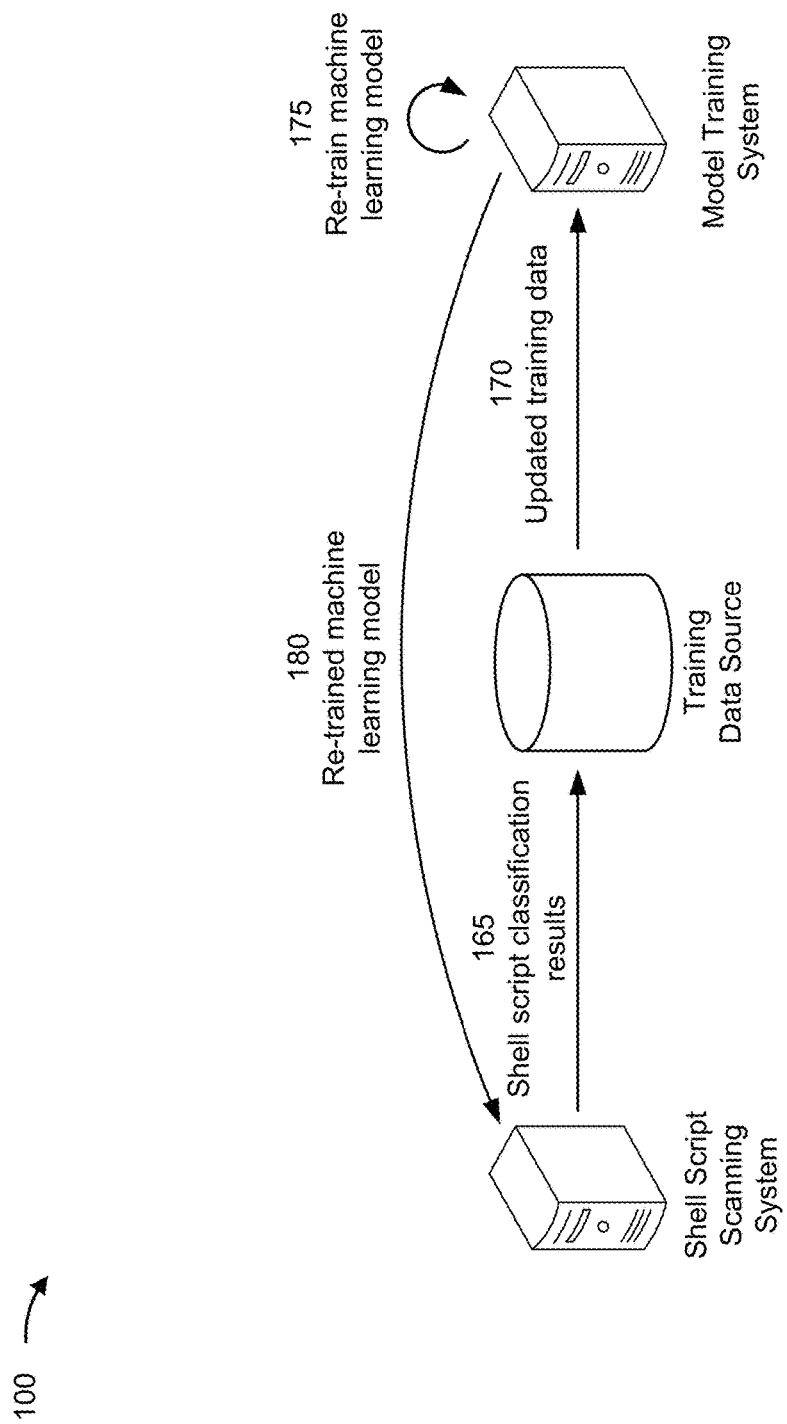

As shown in FIG. 1D, and by reference number 165, the shell script scanning system may transmit, to the training data source, the shell script classification results. The shell script scanning system may transmit classification results for one or more shell scripts to the training data source to be stored in the training data source. For example, once the shell script scanning system determines an obfuscation type for a shell script using the deep learning model, the shell script scanning system may store, in the training data source, a copy of the shell script and obfuscation type determined for the shell script. In some aspects, the shell script scanning system may store, in the training data source, the copy of the shell script and the obfuscation type determined for the shell script after transmitting the shell script classification result to the administrator device and/or the computing device and based on receiving approval of the detected obfuscation type from the administrator device and/or the computing device. The training data source may store the shell script and the determined obfuscation for the shell script as training data for training the deep learning model, resulting in updated training data.

As further shown in FIG. 1D, and by reference number 170, the model training system may receive the updated training data, including the shell script classification results, from the training data source.

As further shown in FIG. 1D, and by reference number 175, the model training system may re-train the machine learning model (e.g., the deep learning model) based on the updated training data. In some implementations, the model training system may retrieve the updated training data and re-train the deep learning model at a periodic time interval. In some implementations, the model training system may re-train the deep learning model based on a determination that a certain quantity of shell script classification results has been added to the training data. Re-training the deep learning model based on the updated training data may provide a benefit of improving the accuracy and/or robustness of the deep learning model due to increased training samples. Re-training the deep learning model based on the updated training data may also provide a benefit of enabling the deep learning model to adjust to changing obfuscation techniques used by malicious actors.

As further shown in FIG. 1D, and by reference number 180, the model training system may transmit, to the shell script scanning system, the re-trained machine learning model (e.g., the re-trained deep learning model). The shell script scanning system may then deploy the re-trained deep learning model and use the re-trained deep learning model to determine probability values for the plurality of obfuscation types.

Using the techniques described herein, a system may determine a respective probability score for each of a plurality of obfuscation types for a shell script, using a trained deep learning model that includes a CNN branch and an FNN branch. The system may detect whether the shell script is obfuscated based on the respective probability score for each of the plurality of obfuscation types determined for the shell script. As a result, the system may detect obfuscated/malicious shell scripts with increased accuracy as compared to rule-based techniques and/or other machine learning techniques As indicated above, FIGS. 1A-1D are provided as an example. Other examples may differ from what is described with regard to FIGS. 1A-1D.

Figure 2:
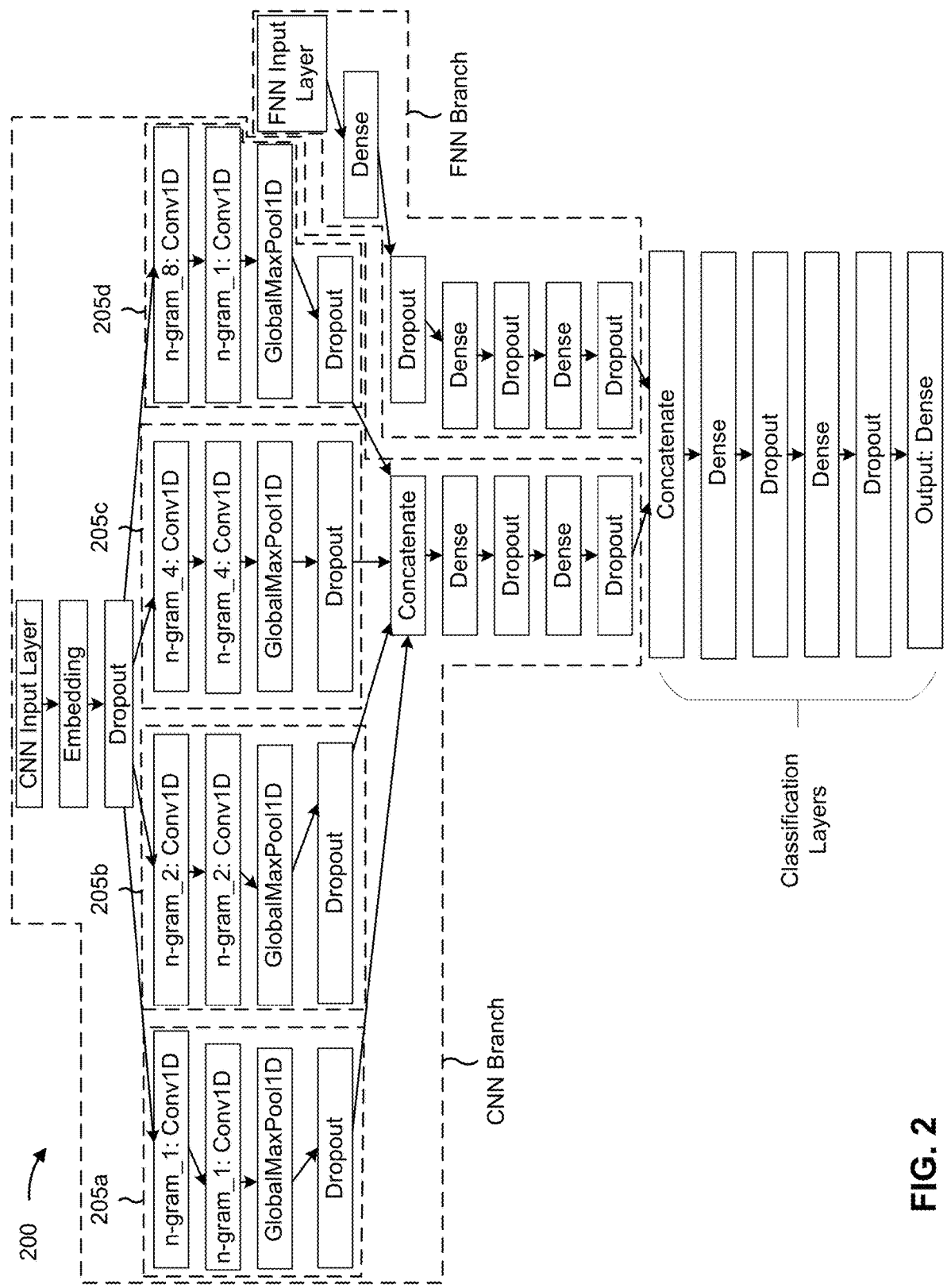
FIG. 2 is a diagram illustrating an example 200 of a network architecture for deep learning model for deep learning based detection of malicious shell scripts

FIG. 2 is a diagram illustrating an example 200 of a network architecture for deep learning model for deep learning based detection of malicious shell scripts. As shown in FIG. 2, the deep learning model may include a CNN branch, an FNN branch, and classification layers that combine the outputs of the CNN branch and the FNN branch to determine probability scores for different obfuscation types for an input shell script.

As shown in FIG. 2, the CNN branch may include a CNN input layer, which inputs the text of a shell script to an embedding layer. The embedding layer may encode the text of the shell script into a sequence of integers based on a learned vocabulary from the training data. For example, the integers in the sequence of integers may represent words in the text of the shell script. In this case, the embedding layer may parse the text into words and generate the sequence of integers representing the words in the text by mapping each word to a respective integer value based on the integers assigned to the words in the learned vocabulary. In some implementations, the sequence of integers, output by the embedding layer, may have a set size. In some implementations, the sequence of integers may be a 5,024-dimensional representation of the text in the shell script (e.g., a vector with a length of 5,024). The embedding layer may encode each word in the text of a shell script as an integer in the sequence of integers, and pad (e.g., using a value of 0) any remaining values in the sequence of integers, in excess of the number of words in the shell script. The embedding layer may be followed by a dropout layer. A dropout layer is a layer that randomly drops out input elements (e.g., randomly sets input elements to 0) from the previous layer to prevent overfitting to the training data.

As further shown in FIG. 2, the CNN branch may include multiple CNN channels 205, each having a different respective kernel size that corresponds to the number of words from the text of a shell script that are grouped together at a time for that CNN channel 205. In this case, the different CNN channels 205 may input the sequence of integers from the embedding layer using n-grams of different sizes, corresponding to the respective kernel sizes of the CNN channels 205. For example, the CNN branch may include a first CNN channel 205a that inputs the sequence of integers one at a time (n-gram of 1), a second CNN channel 205b that inputs the sequence of integers two at a time (n-gram of 2), a third CNN channel 205c that inputs the sequence of integers four at a time (n-gram of 4), and a fourth CNN channel 205d that inputs the sequence of integers eight at a time (n-gram of 8). As shown in FIG. 2, each CNN channel 205a may include two 1D convolutional layers, a 1D global max-pooling layer to consolidate the output from the convolutional layers, and a dropout layer. The 1D convolutional layers may apply convolution to extract feature vectors from input data. In some implementations, an activation function, such as a rectified linear unit (ReLU) activation function, may be applied to the feature output by the convolutional layers. A pooling layer is a layer that reduces the dimensions of feature maps or feature vectors. A global max pooling layer is a layer that downsamples an entire feature map or feature vector to a maximum value in the feature map or feature vector. The CNN branch may further include a concatenation layer that concatenates the output from the multiple CNN channels into a single feature vector, which may then be processed by dense layers and dropout layers. A dense layer is a layer that is fully connected to the previous layer, such that each node/neuron in the layer receives an input from all of the nodes/neurons in the previous layer.

As further shown in FIG. 2, the FNN branch may include an FNN input layer that inputs a character frequency vector associated with a shell script. The FNN branch may further include a series of alternating dense layers and dropout layers. The classification layers of the deep learning model may include a concatenation layer that concatenates the output from the CNN branch and the output from the FNN branch into a combined feature vector. The classification layers further include alternating denser layers and dropout layers, and a final dense layer may be an output layer of the deep learning model. The classification layers may determine predicted probability scores for the plurality of obfuscation types based on the combined output of the CNN branch and the FNN branch. The output layer may output the predicted probability scores for the plurality of obfuscation types.

As indicated above, FIG. 2 is provided as an example. Other examples may differ from what is described with regard to FIG. 2.

Figure 3:
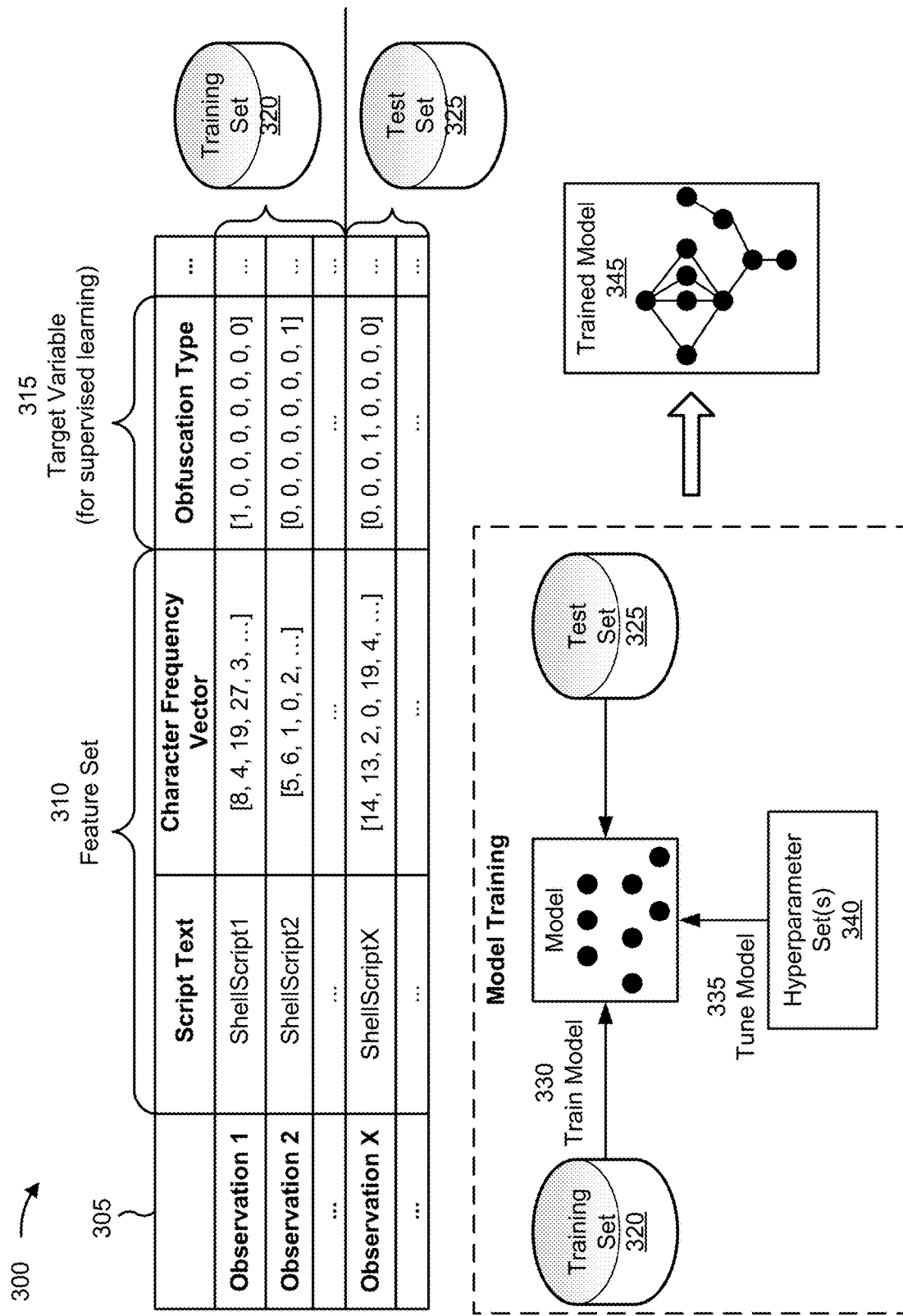
FIG. 3 is a diagram illustrating an example of training a machine learning model in connection with deep learning based detection of malicious shell scripts.

FIG. 3 is a diagram illustrating an example 300 of training a machine learning model in connection with deep learning based detection of malicious shell scripts. The machine learning model training described herein may be performed using a machine learning system. The machine learning system may include or may be included in a computing device, a server, a cloud computing environment, or the like, such as model training system 510 and/or a shell script scanning system 530 described in more detail below.

As shown by reference number 305, a machine learning model may be trained using a set of observations. The set of observations may be obtained and/or input from training data (e.g., historical data), such as data gathered during one or more processes described herein. For example, the set of observations may include data gathered from computing devices 540, as described elsewhere herein. In some implementations, the machine learning system may receive the set of observations (e.g., as input) from training data source 520 and/or shell script database 550.

As shown by reference number 310, a feature set may be derived from the set of observations. The feature set may include a set of variables. A variable may be referred to as a feature. A specific observation may include a set of variable values corresponding to the set of variables. A set of variable values may be specific to an observation. In some cases, different observations may be associated with different sets of variable values, sometimes referred to as feature values. In some implementations, the machine learning system may determine variables for a set of observations and/or variable values for a specific observation based on input received from training data source 520 and/or shell script database 550. For example, the machine learning system may identify a feature set (e.g., one or more features and/or corresponding feature values) from structured data input to the machine learning system, such as by extracting data from a particular column of a table, extracting data from a particular field of a form and/or a message, and/or extracting data received in a structured data format. Additionally, or alternatively, the machine learning system may receive input from an operator to determine features and/or feature values. In some implementations, the machine learning system may perform natural language processing and/or another feature identification technique to extract features (e.g., variables) and/or feature values (e.g., variable values) from text (e.g., unstructured data) input to the machine learning system, such as by identifying keywords and/or values associated with those keywords from the text.

As an example, a feature set for a set of observations may include a first feature of the shell script text, a second feature of the character frequency vector, and so on. As shown, for a first observation, the first feature may have a value of "ShellScript1," the second feature may have a value of [8, 4, 19, 27, 3, . . . ], and so on. These features and feature values are provided as examples and may differ in other examples.

As shown by reference number 315, the set of observations may be associated with a target variable. The target variable may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No), among other examples. A target variable may be associated with a target variable value, and a target variable value may be specific to an observation. In some cases, different observations may be associated with different target variable values. In example 300, the target variable is a vector indicating probability values for a plurality of obfuscation types, which has a value of [1, 0, 0, 0, 0, 0, 0, 0] for the first observation. As described above, the probability values for the obfuscation types may be used to determine an obfuscation type associated with a shell script.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model or a predictive model. When the target variable is associated with continuous target variable values (e.g., a range of numbers), the machine learning model may employ a regression technique. When the target variable is associated with categorical target variable values (e.g., classes or labels), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, or an automated signal extraction model. In this case, the machine learning model may learn patterns from the set of observations without labeling or supervision and may provide output that indicates such patterns, such as by using clustering and/or association to identify related groups of items within the set of observations.

As further shown, the machine learning system may partition the set of observations into a training set 320 that includes a first subset of observations, of the set of observations, and a test set 325 that includes a second subset of observations of the set of observations. The training set 320 may be used to train (e.g., fit or tune) the machine learning model, while the test set 325 may be used to evaluate a machine learning model that is trained using the training set 320. For example, for supervised learning, the test set 325 may be used for initial model training using the first subset of observations, and the test set 325 may be used to test whether the trained model accurately predicts target variables in the second subset of observations. In some implementations, the machine learning system may partition the set of observations into the training set 320 and the test set 325 by including a first portion or a first percentage of the set of observations in the training set 320 (e.g., 75%, 80%, or 85%, among other examples) and including a second portion or a second percentage of the set of observations in the test set 325 (e.g., 25%, 20%, or 15%, among other examples). In some implementations, the machine learning system may randomly select observations to be included in the training set 320 and/or the test set 325.

As shown by reference number 330, the machine learning system may train a machine learning model using the training set 320. This training may include executing, by the machine learning system, a machine learning algorithm to determine a set of model parameters based on the training set 320. In some implementations, deep learning model, that includes a CNN branch, an FNN branch, and one or more classification layers that combine the outputs of the CNN branch and the FNN branch, may be trained using a back-propagation and gradient-descent algorithm.

As shown by reference number 335, the machine learning system may use one or more hyperparameter sets 340 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. Examples of hyperparameters for a deep learning model include learning rate, drop-out rate, epochs, and/or number of neurons (e.g., nodes).

To train a machine learning model, the machine learning system may identify a set of machine learning algorithms to be trained (e.g., based on operator input that identifies the one or more machine learning algorithms and/or based on random selection of a set of machine learning algorithms) and may train the set of machine learning algorithms (e.g., independently for each machine learning algorithm in the set) using the training set 320. The machine learning system may tune each machine learning algorithm using one or more hyperparameter sets 340 (e.g., based on operator input that identifies hyperparameter sets 340 to be used and/or based on randomly generating hyperparameter values). The machine learning system may train a particular machine learning model using a specific machine learning algorithm and a corresponding hyperparameter set 340. In some implementations, the machine learning system may train multiple machine learning models to generate a set of model parameters for each machine learning model, where each machine learning model corresponds to a different combination of a machine learning algorithm and a hyperparameter set 340 for that machine learning algorithm.

In some implementations, the machine learning system may perform cross-validation when training a machine learning model. Cross validation can be used to obtain a reliable estimate of machine learning model performance using only the training set 320, and without using the test set 325, such as by splitting the training set 320 into a number of groups (e.g., based on operator input that identifies the number of groups and/or based on randomly selecting a number of groups) and using those groups to estimate model performance. For example, using k-fold cross-validation, observations in the training set 320 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, or a standard error across cross-validation scores.

In some implementations, the machine learning system may perform cross-validation when training a machine learning model by splitting the training set into a number of groups (e.g., based on operator input that identifies the number of groups and/or based on randomly selecting a number of groups). The machine learning system may perform multiple training procedures and may generate a cross-validation score for each training procedure. The machine learning system may generate an overall cross-validation score for each hyperparameter set 340 associated with a particular machine learning algorithm. The machine learning system may compare the overall cross-validation scores for different hyperparameter sets 340 associated with the particular machine learning algorithm, and may select the hyperparameter set 340 with the best (e.g., highest accuracy, lowest error, or closest to a desired threshold) overall cross-validation score for training the machine learning model. The machine learning system may then train the machine learning model using the selected hyperparameter set 340, without cross-validation (e.g., using all of data in the training set 320 without any hold-out groups), to generate a single machine learning model for a particular machine learning algorithm. The machine learning system may then test this machine learning model using the test set 325 to generate a performance score, such as a mean squared error (e.g., for regression), a mean absolute error (e.g., for regression), or an area under receiver operating characteristic curve (e.g., for classification). If the machine learning model performs adequately (e.g., with a performance score that satisfies a threshold), then the machine learning system may store that machine learning model as a trained machine learning model 345 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 320 (e.g., without cross-validation) and may test each machine learning model using the test set 325 to generate a corresponding performance score for each machine learning model. The machine learning model may compare the performance scores for each machine learning model and may select the machine learning model with the best (e.g., highest accuracy, lowest error, or closest to a desired threshold) performance score as the trained machine learning model 345.

As indicated above, FIG. 3 is provided as an example. Other examples may differ from what is described in connection with FIG. 3. For example, the machine learning model may be trained using a different process than what is described in connection with FIG. 3.

Figure 4:
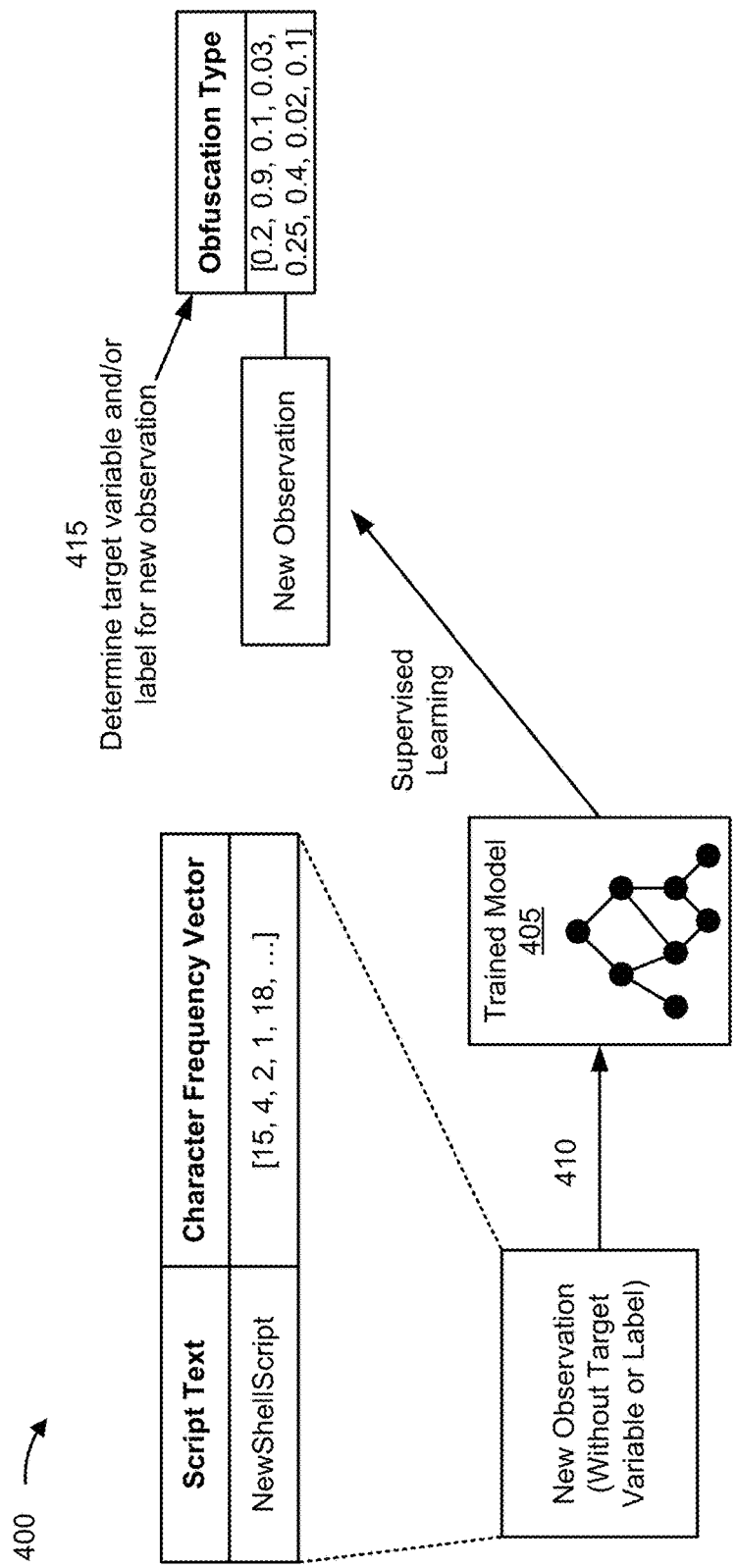
FIG. 4 is a diagram illustrating an example of applying a trained machine learning model to a new observation associated with deep learning based detection of malicious shell scripts.

FIG. 4 is a diagram illustrating an example 400 of applying a trained machine learning model to a new observation associated with deep learning based detection of malicious shell scripts. The new observation may be input to a machine learning system that stores a trained machine learning model 405. In some implementations, the trained machine learning model 405 may be the trained machine learning model 345 described above in connection with FIG. 3. The machine learning system may include or may be included in a computing device, a server, or a cloud computing environment, such as shell script scanning system 530 and/or model training system 510.

As shown by reference number 410, the machine learning system may receive a new observation (or a set of new observations) and may input the new observation to the machine learning model 405. As shown, the new observation may include a first feature of the shell script text, a second feature of the character frequency vector, as an example. The machine learning system may apply the trained machine learning model 405 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, or a classification), such as when supervised learning is employed.

In some implementations, the trained machine learning model 405 may predict a value of [0.2, 0.9, 0.1, 0.03, 0.25, 0.4, 0.02, 0.1] for the target variable of a vector of probabilities for a plurality of obfuscation types for the new observation, as shown by reference number 415. Based on this prediction, the machine learning system may provide a prediction of a second obfuscation type for the shell script.

In this way, the machine learning system may apply a rigorous and automated process to detecting obfuscated/malicious shell scripts. The machine learning system enables recognition and/or identification of tens, hundreds, thousands, or millions of features and/or feature values for tens, hundreds, thousands, or millions of observations, thereby increasing accuracy and consistency and reducing delay associated with detecting obfuscated/malicious shell scripts relative to requiring computing resources to be allocated for tens, hundreds, or thousands of operators to manually detect obfuscated/malicious shell scripts using the features or feature values.

As indicated above, FIG. 4 is provided as an example. Other examples may differ from what is described in connection with FIG. 4.

Figure 5:
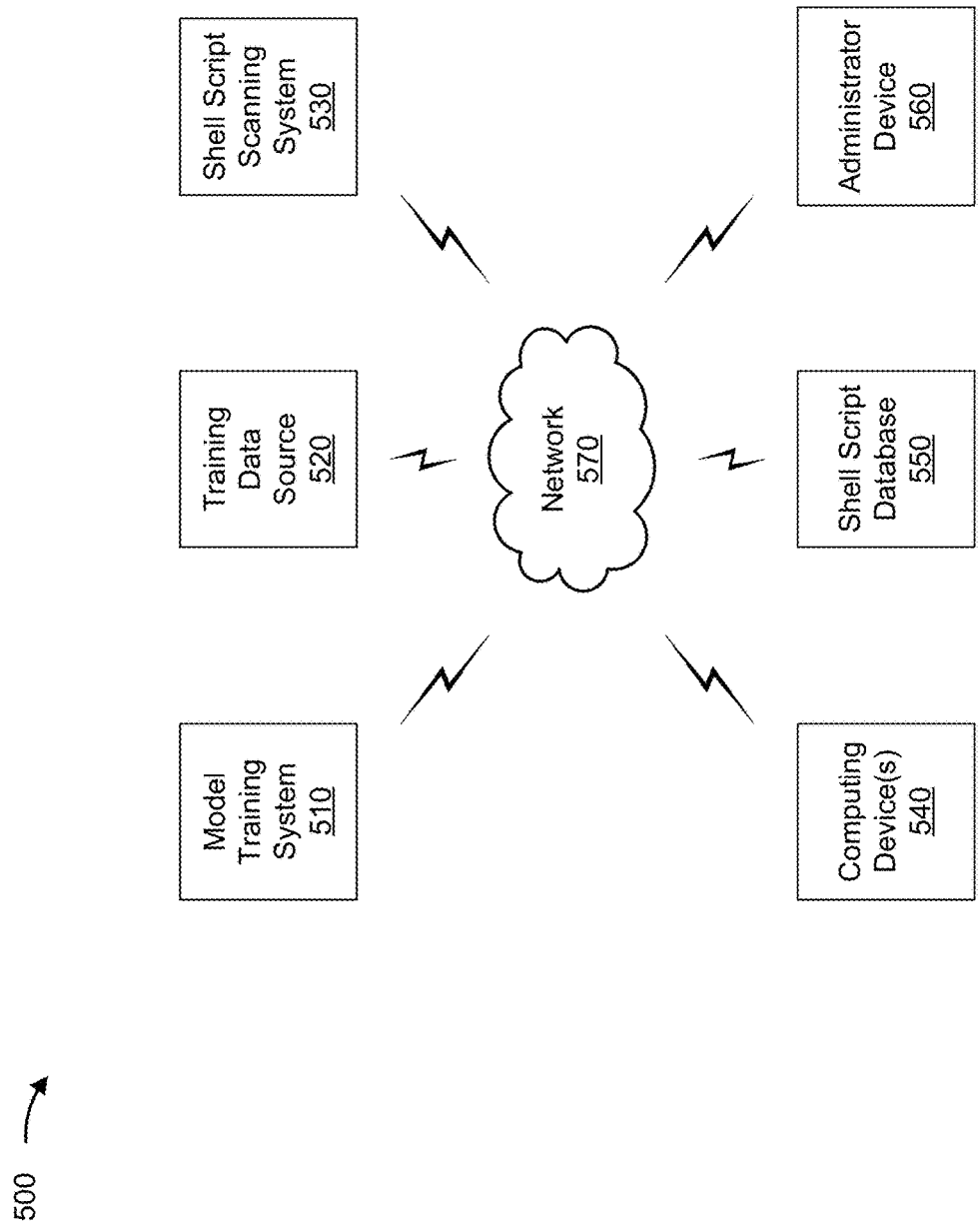
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include a model training system 510, a training data source 520, a shell script scanning system 530, one or more computing devices 540, a shell script database 550, an administrator device 560, and a network 570. Devices of environment 500 may interconnect via wired connections, wireless connections, or a combination of wired and wireless connections.

The model training system 510 includes one or more devices capable of receiving, generating, storing, processing, providing, and/or routing information associated with deep learning based detection of malicious shell scripts, as described elsewhere herein. The model training system 510 may include a communication device and/or a computing device. For example, the model training system 510 may include a server, such as an application server, a client server, a web server, a database server, a host server, a proxy server, a virtual server (e.g., executing on computing hardware), or a server in a cloud computing system. In some implementations, the model training system 510 includes computing hardware used in a cloud computing environment.

The training data source 520 includes one or more devices capable of receiving, generating, storing, processing, and/or providing information associated with deep learning based detection of malicious shell scripts, as described elsewhere herein. The training data source 520 may include a communication device and/or a computing device. For example, the training data source 520 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The training data source 520 may communicate with one or more other devices of environment 500, as described elsewhere herein.

The shell script scanning system 530 includes one or more devices capable of receiving, generating, storing, processing, providing, and/or routing information associated with deep learning based detection of malicious shell scripts, as described elsewhere herein. The shell script scanning system 530 may include a communication device and/or a computing device. For example, the shell script scanning system 530 may include a server, such as an application server, a client server, a web server, a database server, a host server, a proxy server, a virtual server (e.g., executing on computing hardware), or a server in a cloud computing system. In some implementations, the shell script scanning system 530 includes computing hardware used in a cloud computing environment.

The computing device(s) 540 includes one or more devices capable of receiving, generating, storing, processing, and/or providing information associated with deep learning based detection of malicious shell scripts, as described elsewhere herein. The computing device(s) 540 may include a communication device and/or a computing device. For example, the computing device(s) 540 may include a wireless communication device, a mobile phone, a user equipment, a laptop computer, a tablet computer, a desktop computer, a server, or a similar type of device.

The shell script database 550 includes one or more devices capable of receiving, generating, storing, processing, and/or providing information associated with deep learning based detection of malicious shell scripts, as described elsewhere herein. The shell script database 550 may include a communication device and/or a computing device. For example, the shell script database 550 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The shell script database 550 may communicate with one or more other devices of environment 500, as described elsewhere herein.

The administrator device 560 includes one or more devices capable of receiving, generating, storing, processing, and/or providing information associated with deep learning based detection of malicious shell scripts, as described elsewhere herein. The administrator device 560 may include a communication device and/or a computing device. For example, the administrator device 560 may include a wireless communication device, a mobile phone, a user equipment, a laptop computer, a tablet computer, a desktop computer, a server, or a similar type of device.

The network 570 includes one or more wired and/or wireless networks. For example, the network 570 may include a cellular network, a public land mobile network, a local area network, a wide area network, a metropolitan area network, a telephone network, a private network, the Internet, and/or a combination of these or other types of networks. The network 570 enables communication among the devices of environment 500.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
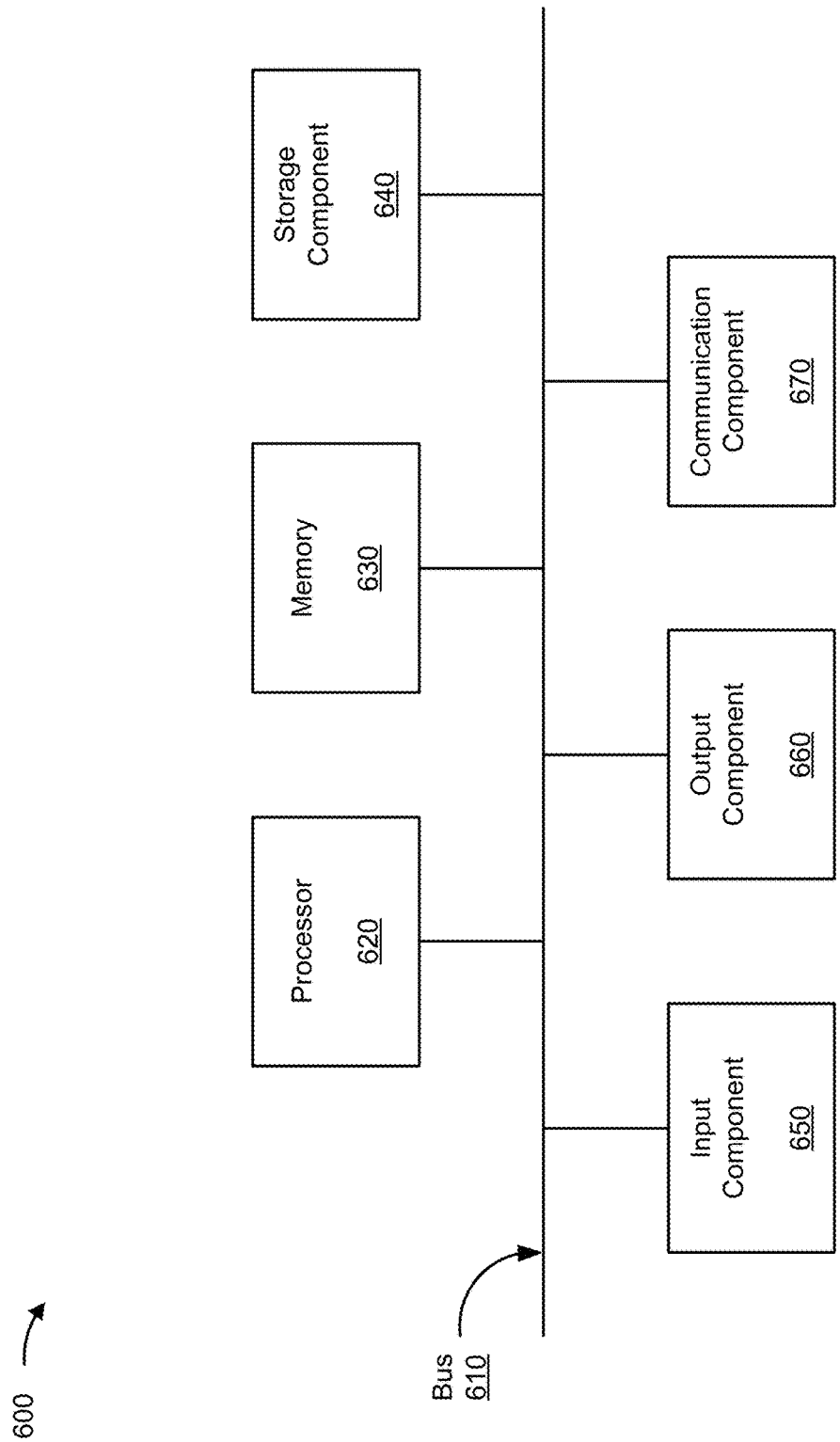
FIG. 6 is a diagram of example components of one or more devices of FIG. 4.

FIG. 6 is a diagram of example components of a device 600, which may correspond to the model training system 510, the training data source 520, the shell script scanning system 530, the computing device(s) 540, the shell script database 550, and/or the administrator device 560. In some implementations, the model training system 510, the training data source 520, the shell script scanning system 530, the computing device(s) 540, the shell script database 550, and/or the administrator device 560 may include one or more devices 600 and/or one or more components of device 600. As shown in FIG. 6, device 600 may include a bus 610, a processor 620, a memory 630, a storage component 640, an input component 650, an output component 660, and a communication component 670.

Bus 610 includes a component that enables wired and/or wireless communication among the components of device 600. Processor 620 includes a central processing unit, a graphics processing unit, a microprocessor, a controller, a microcontroller, a digital signal processor, a field-programmable gate array, an application-specific integrated circuit, and/or another type of processing component. Processor 620 is implemented in hardware, firmware, or a combination of hardware and software. In some implementations, processor 620 includes one or more processors capable of being programmed to perform a function. Memory 630 includes a random access memory, a read only memory, and/or another type of memory (e.g., a flash memory, a magnetic memory, and/or an optical memory).

Storage component 640 stores information and/or software related to the operation of device 600. For example, storage component 640 may include a hard disk drive, a magnetic disk drive, an optical disk drive, a solid state disk drive, a compact disc, a digital versatile disc, and/or another type of non-transitory computer-readable medium. Input component 650 enables device 600 to receive input, such as user input and/or sensed inputs. For example, input component 650 may include a touch screen, a keyboard, a keypad, a mouse, a button, a microphone, a switch, a sensor, a global positioning system component, an accelerometer, a gyroscope, and/or an actuator. Output component 660 enables device 600 to provide output, such as via a display, a speaker, and/or one or more light-emitting diodes. Communication component 670 enables device 600 to communicate with other devices, such as via a wired connection and/or a wireless connection. For example, communication component 670 may include a receiver, a transmitter, a transceiver, a modem, a network interface card, and/or an antenna.

Device 600 may perform one or more processes described herein. For example, a non-transitory computer-readable medium (e.g., memory 630 and/or storage component 640) may store a set of instructions (e.g., one or more instructions, code, software code, and/or program code) for execution by processor 620. Processor 620 may execute the set of instructions to perform one or more processes described herein. In some implementations, execution of the set of instructions, by one or more processors 620, causes the one or more processors 620 and/or the device 600 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 6 are provided as an example. Device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

Figure 7:
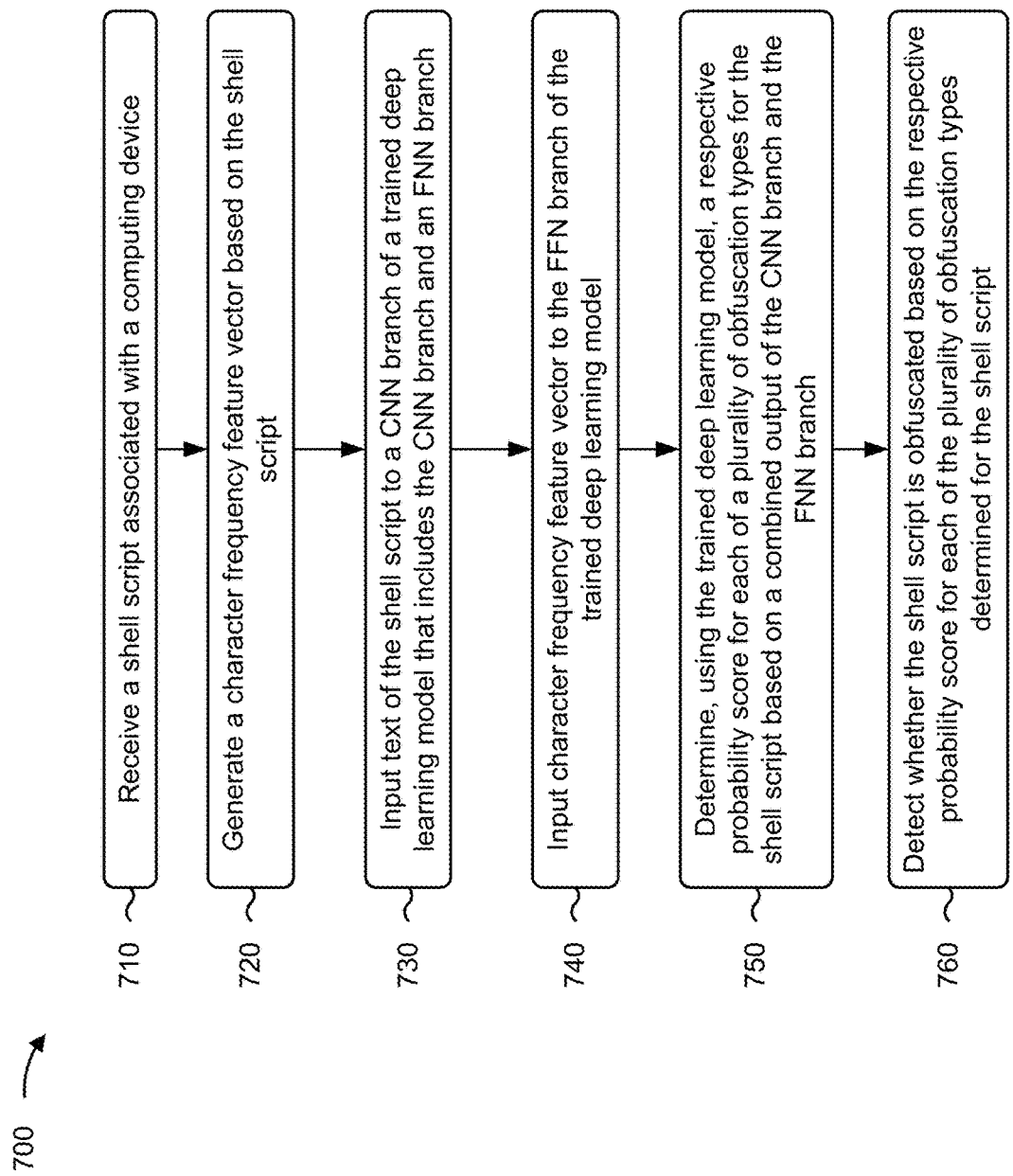
FIG. 7 is a flowchart of an example process relating to deep learning based detection of malicious shell scripts.

FIG. 7 is a flowchart of an example process 700 associated with deep learning based detection of malicious shell scripts. In some implementations, one or more process blocks of FIG. 7 may be performed by a system (e.g., shell script scanning system 530). In some implementations, one or more process blocks of FIG. 7 may be performed by another device or a group of devices separate from or including the system, such as model training system 510, training data source 520, computing device(s) 540, shell script database 550, and/or administrator device 560. Additionally, or alternatively, one or more process blocks of FIG. 7 may be performed by one or more components of device 600, such as processor 620, memory 630, storage component 640, input component 650, output component 660, and/or communication component 670.

As shown in FIG. 7, process 700 may include receiving a shell script associated with a computing device (block 710). As further shown in FIG. 7, process 700 may include generating a character frequency feature vector based on the shell script (block 720). As further shown in FIG. 7, process 700 may include inputting text of the shell script to a CNN branch of a trained deep learning model that includes the CNN branch and an FNN branch (block 730). As further shown in FIG. 7, process 700 may include inputting the character frequency feature vector to the FNN branch of the trained deep learning model (block 740). As further shown in FIG. 7, process 700 may include determining using the trained deep learning model, a respective probability score for each of a plurality of obfuscation types for the shell script based on a combined output of the CNN branch and the FNN branch (block 750). As further shown in FIG. 7, process 700 may include detecting whether the shell script is obfuscated based on the respective probability score for each of the plurality of obfuscation types determined for the shell script (block 760).

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for detecting obfuscated shell scripts, the system comprising:
   one or more memories; and one or more processors, communicatively coupled to the one or more memories, configured to:
  receive a shell script associated with a computing device;
  generate a character frequency feature vector based on the shell script;
  input, into a trained deep learning model that includes a convolutional neural network (CNN) branch and a feedforward neural network branch:
    text of the shell script to the CNN branch, and
    the character frequency feature vector to the feedforward neural network branch;
  determine, using the trained deep learning model, a respective probability score for each of a plurality of obfuscation types for the shell script based on a combined output of the CNN branch and the feedforward neural network branch; and
  detect whether the shell script is obfuscated based on the respective probability score for each of the plurality of obfuscation types determined for the shell script.

2. The system of claim 1, wherein the CNN branch of the trained deep learning model is a multi-channel CNN branch that includes multiple CNN channels having different respective kernel sizes, and wherein a respective kernel size, for each CNN channel of the multiple CNN channels, corresponds to a number of words from the text of the shell script that are grouped together at a time for that CNN channel.

3. The system of claim 1, wherein the CNN branch of the trained deep learning model includes an embedding layer that encodes the text of the shell script into as a sequence of integers based on a learned vocabulary from training data, and wherein the integers in the sequence of integers represent words in the text of the shell script.

4. The system of claim 3, wherein the CNN branch of the trained deep learning model further includes multiple CNN channels that input the sequence of integers using n-grams of different sizes from the sequence of integers.

5. The system of claim 4, wherein the multiple CNN channels include a first CNN channel that inputs the sequence of integers one at a time, a second CNN channel that inputs the sequence of integers in groups of two, a third CNN channel that inputs the sequence of integers in groups of four, and a fourth CNN channel that inputs the sequence of integers in groups of eight.

6. The system of claim 1, wherein the one or more processors, when generating the character frequency feature vector, are configured to:
  determine, for each character of a plurality of characters in a character set, a respective number of occurrences of that character in the shell script.

7. The system of claim 1, wherein the plurality of obfuscation types includes a non-obfuscation type and multiple obfuscation types associated with malicious shell scripts.

8. The system of claim 1, wherein the plurality of obfuscation types include a string single quote obfuscation type, a string varying case obfuscation type, a string all obfuscation type, a string encode obfuscation type, an encoding string interpolation obfuscation type, a string backtick obfuscation type, and a non-obfuscation type.

9. The system of claim 1, wherein the one or more processors are further configured to:
  determine an obfuscation type associated with the shell script based on the respective probability score for each of the plurality of obfuscation types determined for the shell script.

10. The system of claim 9, wherein the one or more processors are further configured to:
  transmit, to the computing device or another computing device, an alert based on detecting that the shell script is obfuscated, wherein the alert indicates the obfuscation type associated with the shell script.

11. The system of claim 1, wherein the one or more processors are further configured to:
  fit a tokenizer to shell scripts in a set of training data to learn a vocabulary for an embedding layer of the CNN branch of the deep learning model; and
  train the deep learning model based on the set of training data to minimize an error measurement between ground truth obfuscation types and obfuscation type classification results based on the combined output of the CNN branch and the feedforward neural network branch over the set of training data.

12. A method detecting obfuscated shell scripts, comprising:
  receiving, by a system, a shell script associated with a computing device;
  generating, by the system, a character frequency feature vector based on the shell script;
  inputting, by the system, text of the shell script to a convolutional neural network (CNN) branch of a trained deep learning model that includes the CNN branch and a feedforward neural network branch;
  inputting, by the system, the character frequency feature vector to the feedforward neural network branch of the trained deep learning model;
  determining, by the system, using the trained deep learning model, a respective probability score for each of a plurality of obfuscation types for the shell script based on a combined output of the CNN branch and the feedforward neural network branch; and
  detecting, by the system, whether the shell script is obfuscated based on the respective probability score for each of the plurality of obfuscation types determined for the shell script.

13. The method of claim 12, wherein the CNN branch of the trained deep learning model is a multi-channel CNN branch that includes multiple CNN channels having different respective kernel sizes, and wherein a respective kernel size, for each CNN channel of the multiple CNN channels, corresponds to a number of words from the text of the shell script that are grouped together at a time for that CNN channel.

14. The method of claim 12, wherein the method further comprises:
  encoding, in an embedding layer of the CNN branch of the trained deep learning model, the text of the shell script into as a sequence of integers based on a learned vocabulary from training data.

15. The method of claim 14, wherein the CNN branch of the trained deep learning model includes multiple CNN channels, each associated with a different respective n-gram size, and the method further comprises:
  inputting, to each CNN channel of the multiple CNN channels of the CNN branch, the sequence of integers using n-grams of a respective n-gram size associated with that CNN channel.

16. The method of claim 12, wherein generating the character frequency feature vector comprises:
  determining, for each character of a plurality of characters in a character set, a respective number of occurrences of that character in the shell script.

17. A non-transitory computer-readable medium storing a set of instructions, the set of instructions comprising:
one or more instructions that, when executed by one or more processors of a system, cause the system to:
receive a shell script associated with a computing device;
generate a character frequency feature vector based on the shell script;
input, into a trained deep learning model that includes a convolutional neural network (CNN) branch and a feedforward neural network branch:
text of the shell script to the CNN branch, and
the character frequency feature vector to the feedforward neural network branch;
determine, using the trained deep learning model, a respective probability score for each of a plurality of obfuscation types for the shell script based on a combined output of the CNN branch and the feedforward neural network branch; and
detect whether the shell script is malicious based on the respective probability score for each of the plurality of obfuscation types determined for the shell script.

18. The non-transitory computer-readable medium of claim 17, wherein the CNN branch of the trained deep learning model includes an embedding layer that encodes the text of the shell script into as a sequence of integers based on a learned vocabulary from training data, and wherein the integers in the sequence of integers represent words in the text of the shell script.

19. The non-transitory computer-readable medium of claim 18, wherein the CNN branch of the trained deep learning model further includes multiple CNN channels that input the sequence of integers using n-grams of different sizes from the sequence of integers.

20. The non-transitory computer-readable medium of claim 17, wherein the one or more instructions, that cause the system to generate the character frequency feature vector, cause the system to:
determine, for each character of a plurality of characters in a character set, a respective number of occurrences of that character in the shell script.

* * * * *